March 14, 1961 P. J. NATHO 2,974,677
HYDRAULIC OPERATOR FAIL-SAFE SURFACE VALVE
Filed June 29, 1956
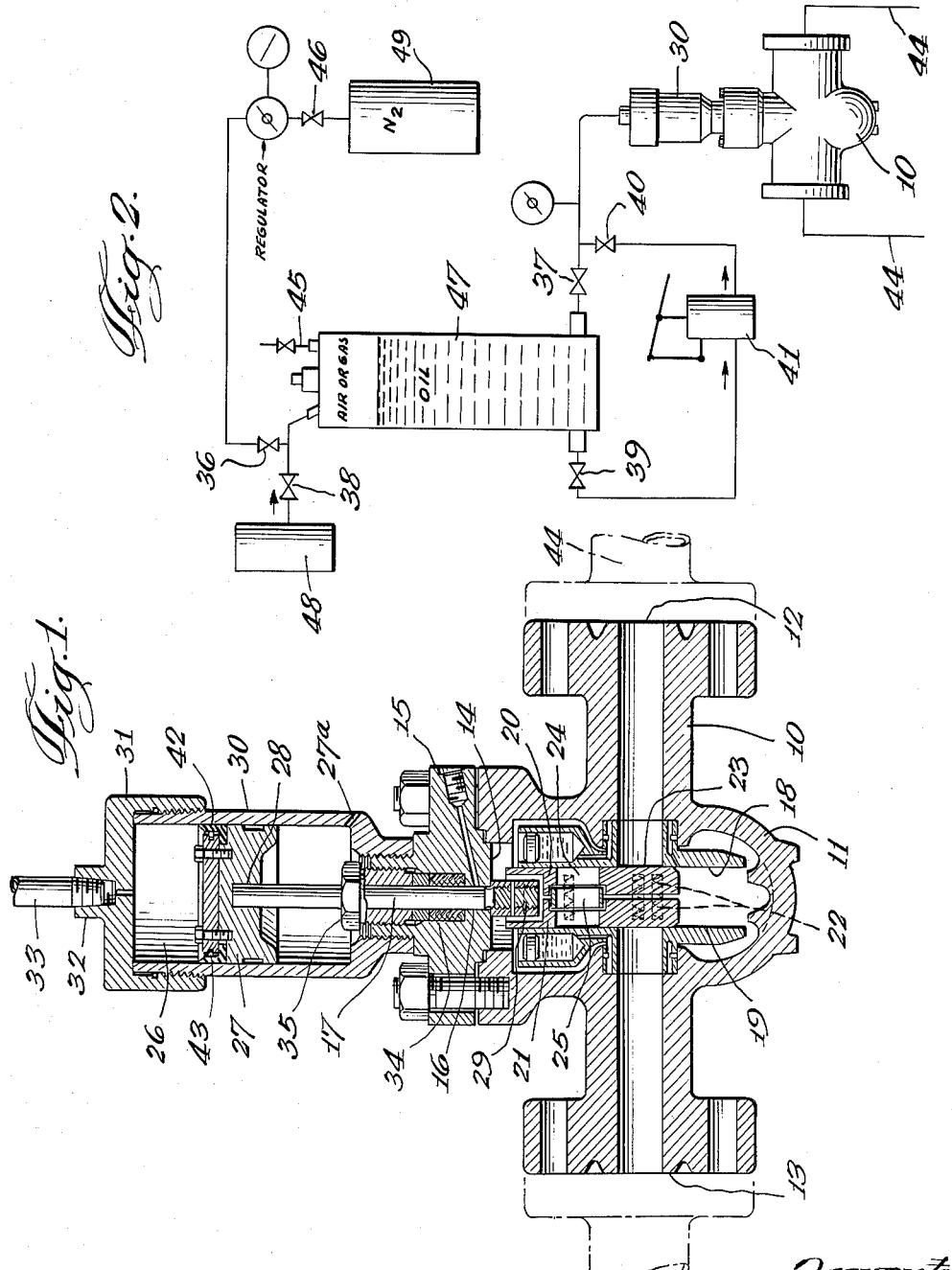
Inventor
Paul J. Natho
By Everett A. Johnson
Attorney › # United States Patent Office 2,974,677
Patented Mar. 14, 1961

2,974,677

HYDRAULIC OPERATOR FAIL-SAFE SURFACE VALVE

Paul J. Natho, Houston, Tex., assignor to Pan American Petroleum Corporation, a corporation of Delaware Filed June 29, 1956, Ser. No. 594,940

3 Claims. (Cl. 137—456)

This invention relates to improvements in valves and more particularly relates to high pressure safety valves which are hydraulically operated.

Valves of this type are designed for use as a surface safety valve in connection with a flowing oil or gas well. The valve is placed within the well head connections, sometimes referred to as a Christmas tree, and is connected to the tubing or casing flow-wing depending upon the method of production from the well.

However, valves of designs heretofore proposed for this purpose have not been entirely satisfactory in all respects. For example, one form of safety valve which embodies some desirable features is unsatisfactory for many uses because if it should fail, it fails open.

It is, therefore, a primary object of my invention to provide a valve structure which fails closed. Another object of the invention is to provide means for remotely controlling the operation of the valve. A further object of the invention is to provide a valve structure wherein the pressure of the line controlled is effective in closing the valve in the event of a control failure. Another object of the invention is to provide an operator for a high pressure safety valve which includes hydraulic operating means.

Still another object of the invention is to provide a reverse action valve which is foolproof in operation and of simple mechanical construction. A further object of the invention is to provide a hydraulic operator or mechanism adaptable for controlling a wide variety of gate valves which employ a self-rising stem. It is also an object of the invention to provide a gate member for use on a self-rising stem which has a lower blind and an upper flow port whereby the gate member fails closed. These and other objects of the invention will become apparent as the more detailed description thereof proceeds.

In general I attain the objects of my invention by providing hydraulically operated surface safety valve for use on high pressure fluid lines which employs a fail-closed gate member which has a lower blind and an upper flow port; the gate member is supported by a self-rising stem which in turn is positioned by a hydraulic operator which acts in opposition to the closing action of the pressure in the line under control.

When the well is produced through the tubing, my reverse-action safety valve is placed in the tubing flow-wing between the regular flow wing valve and the flow wing choke. The valve is normally closed and it is opened hydraulically by means of an hydraulic pump connected between the oil reservoir and the valve cylinder. The well effluent usually flows to a gas-oil separator which operates at a pressure sufficiently high to furnish the fluid pressure required for the operation of the hydraulic valve operating system and holding the valve open. However, I may provide the valve-operating system with a separate high pressure supply from a nitrogen or other suitable pressure cylinder until the flowing well provides sufficient pressure via the gas-oil separator to hold the reverse action valve open.

In a typical hydraulic system, high pressure gas from a normal pressure supply such as a gas-oil separator is reduced to about 30 pounds to serve as the supply gas for a standard pressure controller which is connected to a point to be controlled. The pressure controller in turn actuates a diaphragm three-way valve to apply or release the high pressure gas from the upper portion of an oil reservoir in the hydraulic operating system. The oil reservoir is connected to the operating cylinder of the safety valve by means of an oil or hydraulic line.

Further details of construction and advantages of my invention will be described in conjunction with a preferred embodiment of the invention illustrated by the drawings wherein:

Figure 1 is an elevation, partly in section; and
Figure 2 is a schematic showing of a typical installation employing the valve of Figure 1.

Referring to the drawing, the valve 10 comprises a hollow body 11 having inlet and outlet openings 12 and 13 for the flow of fluid therethrough and a top opening 14 through which the valve components may be introduced. The top opening 14 is closed by a bonnet 15 bolted to the body 11. A passage 16 is provided through the bonnet 15 within which is disposed the valve stem 17.

Within the valve housing 11 and secured to the inlet and outlet openings 12 and 13, I provide the valve seats 18 and 19. Between the valve seats 18 and 19 are the valve gates 20 and 21 which are pressed toward the adjacent seats and from each other by springs 22. The valve gates 20 and 21 are provided with the blinds 23 and the flow ports 24. A ring 25 aligned with the flow ports 24 is interposed between the gates 20 and 21.

In the upper portion of the body 11 is provided a pair of reservoirs open at their tops to admit pressure which may be applied to the gate chamber from the high pressure side of the valve. This pressure is exerted on the top of the piston plugs which are slidably arranged in each reservoir. With a pressure differential across the piston plug connected to the outlet seat, sealing lubricant is fed from the reservoir into the sealing groove about the outlet gate member.

When the hydraulic pressure is removed from the operating cylinder 26 the pressure within the valve body 11, which is substantially the pressure in the upstream end of line 44, acts on the valve stem 17 causing same and piston 27 to travel upwardly thereby moving valve gates 20 and 21 until the blinds 23 are in register with the valve seats 18 and 19 whereby the valve 10 is normally maintained in closed position. As the valve closes, the downstream blind 23 acting against seat 19 stops the flow of fluid but the upstream pressure compresses the springs 22 and partially unseats the upstream blind 23 so that the pressure in the body acting against the valve stem 17 is always substantially equal to the upstream pressure in line 44.

The operator 30 includes the cylinder 26 having the piston 27 which contacts valve stem 17. The upper end of the cylinder 26 is closed by threaded cap 31 and has a tapped boss 32 which connects with the hydraulic operating line 33. The lower end of the cylinder 26 is threaded to the bonnet 15 which in turn is bolted to the valve body 11. Suitable packing 34 between the stem 17 and the bore 16 within the bonnet 15 is provided as illustrated in Figure 1. This includes the compressible packing and a follower nut 35.

The lower end of the valve stem 17 within the bonnet 15 is provided with element 29 which is interlocked within the upper part of the valve gates 20 and 21. The guide ring 25 aligns the individual gate members 20 and 21, and the springs 22 keep them apart as described.

The hydraulic cylinder operator 30 is used in conjunction with a reverse action gate valve 10 to serve as a surface safety valve for oil or gas well control. In normal operation, pressure control valves 37 and 38 are open and valves 39, 40 and 36 are closed.

In the illustrated embodiment, the hydraulic operator 30 itself is a single cylinder 26 containing a piston 27 with a resilient cup 42 and an expander ring 43. The piston 27 in turn has a bore 28 in its lower side to receive the valve stem 17 of the subjacent gate valve 10. The pressure within the cylinder 26 which is normally the pressure at the control point, e.g., a gas-oil separator 48 or other vessel or line downstream from the safety valve 10, acts on the piston 27 and pushes valve stem 17 inward into the valve body 11 to open the valve gates 20 and 21. A vent 27a is provided for venting the cylinder 30 below the piston 27. When the pressure is released from the hydraulic cylinder 26, the pressure within the valve body 11 (and the pipe line 44) acts on the valve stem 17 to push the stem 17 outward from the valve body 11 to bring the blinds 23 in register with valve seats 18 and 19.

In emergency valve operation with a separate source of gas pressure, such as nitrogen cylinder 49, valves 36, 37, and 46 are opened and valves 38, 39, 40, and 45 closed in order to open the safety valve 10. To close the safety valve 10 the valves 37 and 45 are opened and valves 36, 38, 39 and 40 are closed.

In an emergency operation with the pump 41, the safety valve 10 is opened by opening valves 39, 40 and 45 and by closing valves 36, 37 and 38. To close safety valve 10 under such emergency operation, valves 36, 38, 39 and 40 are closed and valves 37 and 45 are opened.

If the well is flowing and conditions arise at the control point, e.g., a line break or other major leak at the gas-oil separator 48, which would require the controller to close the valve 10, the decreased pressure at the control point and in the controller releases the high pressure gas from the oil reservoir 47 which in turn releases the cylinder pressure from the valve operating cylinder 26 of operator 30. With a substantially lower pressure in the cylinder 26, the pressure within the valve body 11 acting on the valve stem 17 moves the valve gates 20—21 upwardly to a closed position with the stem 17 out.

Although the invention has been described with reference to a preferred embodiment thereof, it is to be understood that this is by way of illustration only. Accordingly, it is contemplated that modifications and variations can be made in the apparatus by those skilled in the art in light of the preceding description and without departing from the spirit and scope of the invention.

What I claim is:

1. A safety valve for use upstream from a pressure-reducing choke on a high-pressure flow line comprising a valve body, a flow channel extending through said body having opposed spaced seats intermediate its ends, a gate member within said body having a blind and a flow port and comprising two opposed spaced-apart plates cooperating respectively with said seats to control flow of fluid through said channel, spring means interposed between said plates and urging said plates into engagement with their respective seats, said gate member being adapted to move relative to said body so that said blind and said flow port can be selectively disposed in said flow channel, an opening in said body substantially at right angles to said flow channel, a stem connected to said gate member adjacent said flow port and on the common axis of said flow port and said blind and extending through said opening, pressure-seal means in said opening around said stem, the upstream plate of said gate member responding to the flow-channel pressure to move axially of its seat against said spring means, whereby the pressure fluid in said channel enters said valve body and acts on said stem to urge said gate member to the completely closed position, means including a piston forming an enclosed pressure chamber on said body, said piston being connected to the end of said stem opposite said gate member so that the pressure in said pressure chamber acting on said piston to open said valve opposes the pressure in said flow channel acting on said stem to close said valve, said pressure-chamber pressure and said flow-channel pressure supplying substantially the only forces for moving said gate member, and conduit means hydraulically connecting said flow channel downstream from said gate member to said pressure chamber so that the reduced pressure downstream from said valve holds said valve open except upon a substantial decrease of said reduced downstream pressure, whereby upon a substantial further reduction of pressure in said flow channel downstream from said gate member said valve is automatically closed.

2. A safety valve for use upstream from a pressure-reducing choke on a high-pressure flow line comprising a valve body, a flow channel extending through said body having opposed spaced seats intermediate its ends, a gate member within said body having a blind and a flow port and comprising two opposed spaced-apart plates cooperating respectively with said seats to control flow of fluid through said channel, spring means interposed between said plates and urging said plates into engagement with their respective seats, said gate member being adapted to move relative to said body so that said blind and said flow port can be selectively disposed in said flow channel, an opening in said body substantially at right angles to said flow channel, a stem connected to said gate member adjacent said flow port and on the common axis of said flow port and said blind and extending through said opening, pressure seal means in said opening around said stem, the upstream plate of said gate member responding to the flow-channel pressure to move axially of its seat against said spring means, whereby the pressure fluid in said channel enters said valve body and acts on said stem to urge said gate member to the completely closed position, means including a piston forming an enclosed pressure chamber on said body, the area of said piston being greater than the area of said opening, said piston being connected to the end of said stem opposite said gate member so that the pressure in said pressure chamber acting on said piston to open said valve opposes the pressure in said flow channel acting on said stem to close said valve, said pressure-chamber pressure and said flow-channel pressure supplying substantially the only forces for moving said gate member, a pressure-control point in fluid communication with and downstream from said valve, and conduit means hydraulically connecting said pressure-control point to said pressure chamber so that the reduced pressure at said control point holds said valve open except upon a substantial further decrease of the pressure at said control point.

3. A safety valve according to claim 2 including external means to apply pressure to said pressure chamber to open said valve.

References Cited in the file of this patent

UNITED STATES PATENTS

| | | |
|---|---|---|
| 370,339 | Johnston | Sept. 20, 1887 |
| 551,370 | Donnelly | Dec. 17, 1895 |
| 1,516,011 | Heath | Nov. 18, 1924 |
| 1,619,130 | Jones | Mar. 1, 1927 |
| 2,270,037 | Corbin | Jan. 13, 1942 |
| 2,395,212 | Blanchard | Feb. 19, 1946 |